(12) United States Patent
Roberson et al.

(10) Patent No.: US 12,513,263 B2
(45) Date of Patent: Dec. 30, 2025

(54) VEHICLE CAMERA AND RECORD SYSTEM

(71) Applicants: Roosevelt Roberson, Robersonville, NC (US); Jermal Roberson, Waxhaw, NC (US)

(72) Inventors: Roosevelt Roberson, Robersonville, NC (US); Jermal Roberson, Waxhaw, NC (US); Alice Wilson Roberson, Robersonville, NC (US)

( * ) Notice: Subject to any disclaimer, the term of this patent is extended or adjusted under 35 U.S.C. 154(b) by 38 days.

(21) Appl. No.: 18/056,056

(22) Filed: Nov. 16, 2022

(65) Prior Publication Data

US 2023/0077213 A1    Mar. 9, 2023

Related U.S. Application Data

(63) Continuation-in-part of application No. 16/719,205, filed on Dec. 18, 2019, now abandoned.

(60) Provisional application No. 62/798,545, filed on Jan. 30, 2019.

(51) Int. Cl.
| | |
|---|---|
| *H04N 7/18* | (2006.01) |
| *G07C 5/00* | (2006.01) |
| *G07C 5/08* | (2006.01) |
| *H04N 5/77* | (2006.01) |
| *H04N 23/65* | (2023.01) |
| *H04N 23/66* | (2023.01) |
| *H04N 23/698* | (2023.01) |
| *H04N 23/90* | (2023.01) |

(52) U.S. Cl.
CPC ............. *H04N 7/181* (2013.01); *G07C 5/008* (2013.01); *G07C 5/085* (2013.01); *H04N 5/77* (2013.01); *H04N 23/651* (2023.01); *H04N 23/66* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 8,081,771 B2 | 12/2011 | Harrington et al. | |
| 8,498,568 B2 | 7/2013 | Patsiokas et al. | |
| 9,578,275 B2 | 2/2017 | Ramirez | |
| 10,629,016 B1* | 4/2020 | Helm | B60R 9/065 |
| 2008/0122597 A1 | 5/2008 | Englander | |
| 2009/0073000 A1* | 3/2009 | Chae | G08G 1/167 |
| | | | 340/937 |
| 2009/0075624 A1 | 3/2009 | Cox et al. | |
| 2010/0114437 A1* | 5/2010 | Boss | B60K 28/08 |
| | | | 701/48 |
| 2011/0066317 A1 | 3/2011 | Lee | |
| 2014/0132754 A1 | 5/2014 | Saley, Jr. et al. | |
| 2014/0218529 A1 | 8/2014 | Mahmoud et al. | |
| 2014/0277833 A1 | 9/2014 | Palan | |

(Continued)

*Primary Examiner* — Hung Q Dang
(74) *Attorney, Agent, or Firm* — Boudwin Intellectual Property Law, LLC; Daniel Boudwin (57) ABSTRACT

A vehicle camera and record system including a plurality of cameras located around a vehicle. The cameras are positioned such that at least a 360-degree planar view is provided surrounding the vehicle. A control unit is operably coupled to the cameras. The controller includes a computer readable storage device. The cameras will record the surrounding area of the vehicle. Media recorded by the cameras will be stored on the computer readable storage device such that the media can be accessed at a later time and date.

1 Claim, 5 Drawing Sheets

(56) References Cited

U.S. PATENT DOCUMENTS

| | | |
|---|---|---|
| 2015/0199712 A1 | 7/2015 | Radziwonczyk-Syta et al. |
| 2015/0203059 A1 | 7/2015 | Narita |
| 2017/0001565 A1 | 1/2017 | Nakano et al. |
| 2017/0197656 A1 | 7/2017 | Oh |
| 2017/0249328 A1 | 8/2017 | Liang et al. |
| 2017/0347002 A1 | 11/2017 | Baker et al. |
| 2018/0170258 A1 | 6/2018 | Matsuzaki |
| 2021/0127062 A1* | 4/2021 | Kuehnle ................ H04N 7/183 |
| 2022/0207278 A1* | 6/2022 | Nagata .................... H04N 5/77 |

* cited by examiner

VEHICLE CAMERA AND RECORD SYSTEM

CROSS REFERENCE TO RELATED APPLICATIONS

This application is a continuation-in-part and claims the benefit of U.S. patent application Ser. No. 16/719,205 filed on Dec. 18, 2019, which in turn claims the benefit of U.S. Provisional Application No. 62/798,545 filed on Jan. 30, 2019. The above identified patent applications are herein incorporated by reference in their entirety to provide continuity of disclosure.

BACKGROUND OF THE INVENTION

The present invention relates to vehicle cameras. More particularly, the present invention provides a vehicle camera system that will be able to keep records of accidents and, in a commercial setting, keep track of the logs for the driver.

Accidents frequently happen in motor vehicles. Once these accidents happen, it can be difficult to determine what actually happened. When an individual suffers a traumatic event, it can be difficult to remember the details let alone factually recount what happened. This can be extremely problematic when a car accident occurs.

Many times, the person at fault for the accident must cover the cost of the damage. Even with insurance, this will cost the individual a considerable amount of money. This could lead some people to claim they were not at fault even when they were. This can be an especially large issue for commercial drivers, such as delivery drivers or semi drivers. While it may be true that the company will cover the insurance when one of these professionals is in an accident, the individual could face various forms of discipline at work, including being fired.

Further, in some instances, vehicles are stolen either for a joyride or to be chopped up and sold. In these instances, it can be very difficult to locate the vehicle. In many cases, even if the vehicle is located, the thief may never be caught. While some cars do provide GPS or a single camera, these cameras are not positioned to capture the entire area surrounding a vehicle. Further, many times there is a monthly charge to monitor the whereabouts of a vehicle.

Consequently, there is a need for an improvement in the art of vehicle cameras. The present invention substantially diverges in design elements from the known art while at the same time solving a problem many people face when attempting to record the real time action of a car accident. In this regard the present invention substantially fulfills these needs.

SUMMARY OF THE INVENTION

The present invention provides a vehicle camera and record system wherein the same can be utilized for providing convenience for the user when using a video system for a vehicle. The vehicle camera and record system is comprised of a plurality of cameras positioned around a vehicle. The plurality of cameras are operably coupled to a control unit. The control unit turns the cameras on and off and directs storage of the captured video. There is a computer readable storage device operably coupled to a control unit to store the video footage.

Another object of the vehicle camera and record system is for the cameras to be removably attached to the vehicle.

Another object of the vehicle camera and record system is to provide cameras that are wirelessly coupled to the control unit.

Another object of the vehicle camera and record system is to have a power source located in each camera.

Another object of the vehicle camera and record system is to have the cameras wired to the control unit.

Another object of the vehicle camera and record system is to have a sensor located within the door handle of a vehicle, wherein the sensor is operably coupled to the control unit. The sensor will detect an attempted entry into the vehicle and start the recording of the cameras.

Another object of the vehicle camera and record system is to have a sensor that detects when the vehicle is in use, wherein the sensor is operably coupled to the control unit.

Another object of the vehicle camera and record system is to have the control unit located within the dash.

Another object of the vehicle camera and record system is to have a display screen operably coupled to the control unit.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the vehicle camera and record system. For the purpose of presenting a brief and clear description of the present invention, a preferred embodiment will be discussed as used for the vehicle camera and record system. The figures are intended for representative purposes only and should not be considered to be limiting in any respect.

Figure 1:
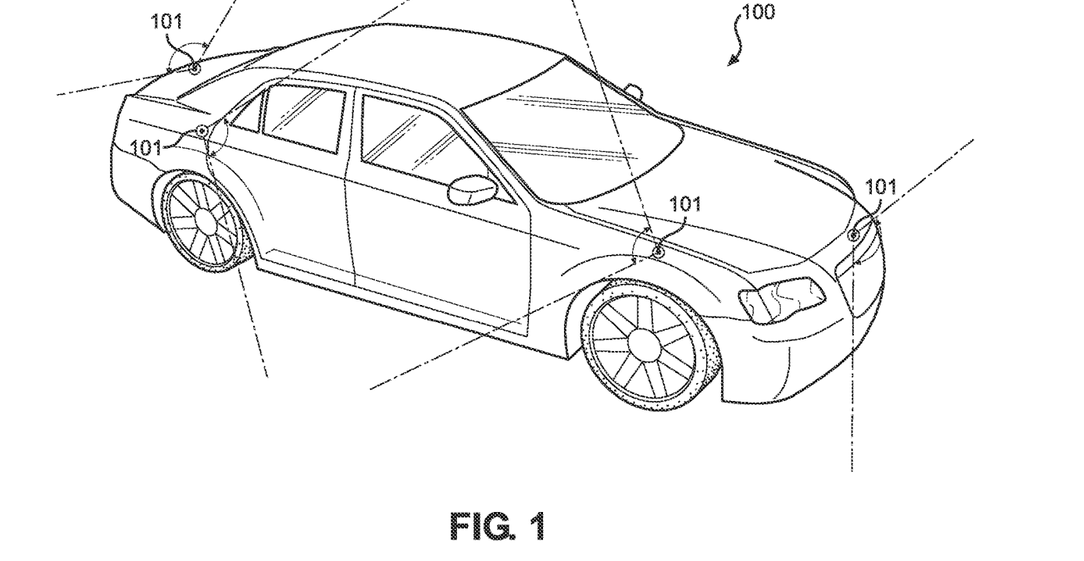
FIG. 1 shows a perspective view of an embodiment of the cameras attached to a vehicle.

Referring now to FIG. 1, there is shown a perspective view of an embodiment of the cameras attached to a vehicle. The vehicle camera and record system 100 is designed to work with a plurality of cameras 101. In one embodiment, each camera of the plurality of cameras 101 is a waterproof camera. In one embodiment, the plurality of cameras 101 are magnetically attached to the vehicle. In this embodiment, there is a magnet located on the base of each camera. In another embodiment, the plurality of cameras 101 are fixed to the vehicle.

The plurality of cameras 101 are capable of recording video or taking images. The plurality of cameras 101 may have a variety of angles of capture. In one embodiment, the angles are different for each camera respectively. At least one camera is placed on a vehicle such that it can record the surroundings of the vehicle. There can be a plurality of cameras 101 placed at various places on the vehicle to be able to record a 360-degree area around the vehicle. In one embodiment, a camera is located under the vehicle. This camera will be able to capture the parts under the vehicle and take notice if a part breaks. This will allow a user to diagnose an issue earlier or stop and pull over if a dangerous situation occurs due to a part breaking.

Figure 2:
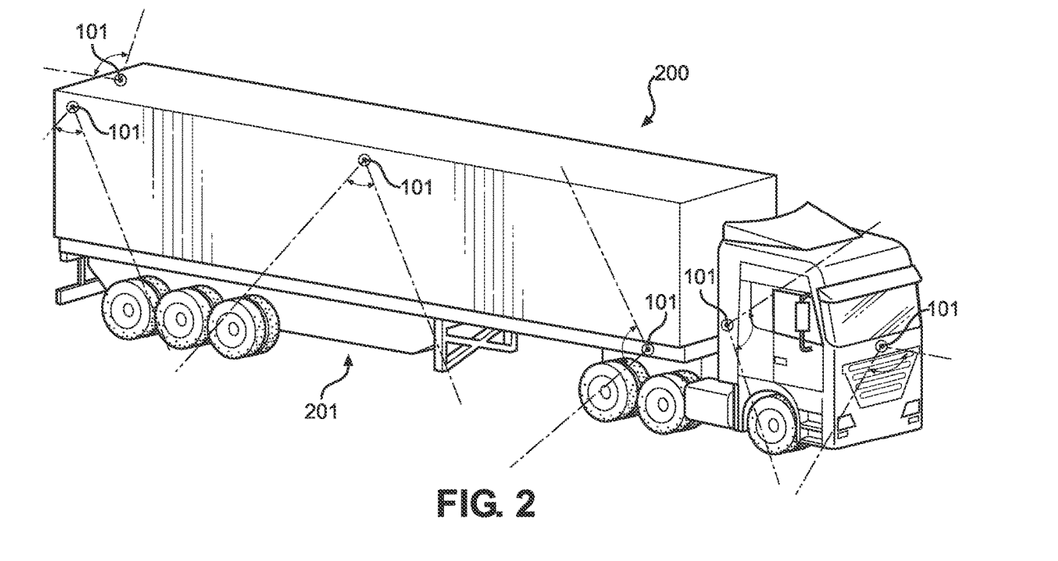
FIG. 2 shows a perspective view of an embodiment of the cameras attached to a semi.

Referring now to FIG. 1 and FIG. 2, there is shown a perspective view of an embodiment of the cameras attached to a car and semi respectively. The plurality of cameras 101 are placed in various locations around different vehicles. In one embodiment, there are cameras placed on the hood and trunk of a car as well as above each wheel. In this embodiment, the camera angles will capture the front and rear of the vehicle and the doors. The plurality of cameras 101 may capture different fields of vision to ensure that the video will capture the entire surrounding of the vehicle. Further, in another embodiment cameras are placed around a semi-truck and trailer. In one embodiment the cameras are placed on the front, rear, top, and side of the trailer as well as the front and sides of the truck. In one embodiment the cameras have a slightly overlapping field of view. In another embodiment the cameras are positioned such that when viewed together they give a full panoramic view.

Figure 3:
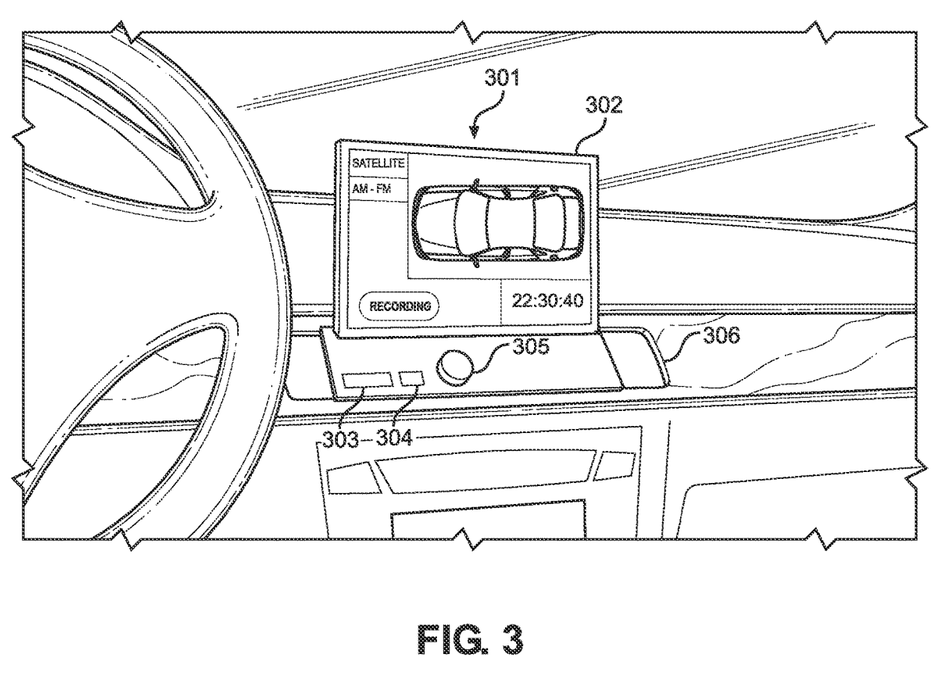
FIG. 3 shows a perspective view of an embodiment of the controller installed within a dashboard of a vehicle.

Referring now to FIG. 3, there is shown a perspective view of an embodiment of the control unit installed within a dashboard of a vehicle. The cameras surrounding the outside of the vehicle are operably coupled to a control unit 301 located on the interior of the vehicle. In one embodiment, the controller 301 is built into the dashboard 306. In an embodiment where the control unit 301 is in the dashboard 306, the controller 301 also functions as the vehicle's audio head unit. This will allow the control unit 301 to take the place of a standard head unit and not require a special dashboard cutout in order to be installed. In another embodiment, the control unit 301 can be placed on the top of the dashboard 306. This will allow for easy installation.

The control unit 301 has several ports 303, 304 located on a front thereof. In one embodiment, a first port 303 is a memory card slot. In one embodiment, the first port 303 is configured to accept micro-SD cards. In another embodiment, the first port 303 is configured to accept SD cards. The first port 303 will allow for additional storage to be added to the control unit 301. In another embodiment, the first port 303 will allow an individual to insert a card and take information from the controller 301. The control unit 301 further has a second port 304. In one embodiment, the second port 304 is configured to accept a USB connector. In another embodiment, the second port 304 is configured to accept micro USB connectors. In this way, the second port 304 will allow a user to attach a computer or other device to the controller 301.

The control unit 301 further has a display screen 302 attached thereto. The display screen 302 will allow a user to view the video recorded by the cameras. In one embodiment, the display screen 302 is an LCD screen. In one embodiment, the display screen 302 is in a fixed position. In another embodiment, the display screen 302 is capable of folding down and sliding within the housing of the control unit 301. In this embodiment there is a slot located within the housing of the control unit 301 that is dimensioned to receive the screen therein. Further, the screen is pivotally secured to a sliding track located within the slot. This will allow the screen to be tilted down then pushed into the housing. In one embodiment, the display screen 302 is a touch screen. The display screen 302 will be capable of having a picture in picture feature. This will allow a person to view the video and do another task at the same time.

In one embodiment the display screen 302 is further configured to display a designation if a door is opened. In another embodiment the control unit 301 will direct the display screen to show commercial drivers daily logging. In another embodiment the system will have an alarm clock functionality. In one embodiment the cameras can be accessed as a back-up camera system. In one embodiment the control unit is further configured to have a radio build therein. This radio can pick up AM and FM. In one embodiment the radio is further configured to play satellite radio.

Figure 4:
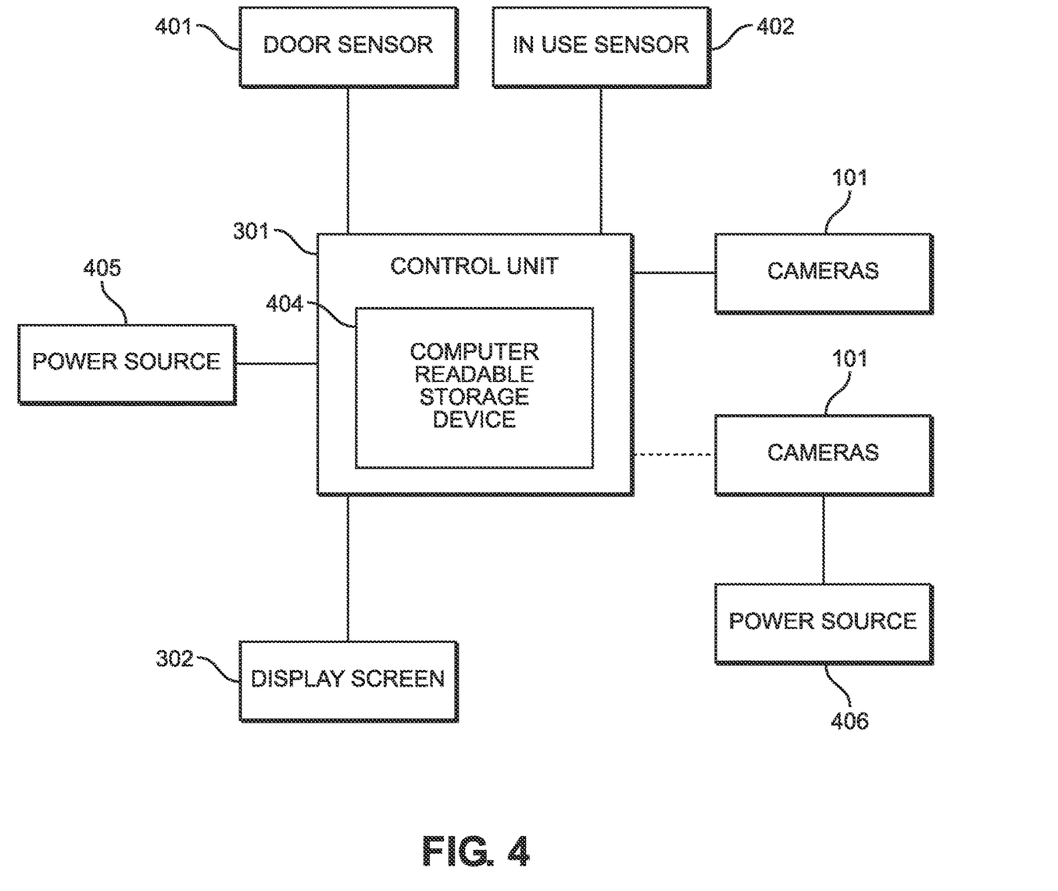
FIG. 4 shows a wiring diagram of an embodiment of the vehicle camera and record system.

Referring now to FIG. 4, there is shown a wiring diagram of an embodiment of the vehicle camera and record system. The control unit 301 is located within the controller as described in FIG. 3. The control unit 301 will control the operation of the cameras 101. Further, the control unit 301 will manage the saving of the video recorded by the cameras 101. The control unit 301 is operably coupled to a computer readable storage device 404. In one embodiment, the computer readable storage device 404 is located within the central control unit 301. The control unit 301 is operably coupled to the display screen 302.

The control unit 301 is electrically connected to a power source 405. In one embodiment the power source 405 is a vehicle battery. The central controller 403 will then send power to the rest of the system respectively. In one embodiment the central controller 403 is operably coupled to a door sensor 401. In one embodiment the door sensor 401 is located within the door handle. In another embodiment the door sensor 401 is located within the door. In another embodiment the control unit 301 is operably coupled to an in-use sensor 402. The in-use sensor 402 will allow the central controller 403 to determine if the vehicle is in use. In one embodiment the control unit 301 is operably coupled to both the door sensor 401 and the in-use sensor 402.

The control unit 301 is operably coupled to at least one camera 101. In one embodiment the cameras 101 are connected to the control unit 301 via a wired connection. In this embodiment the cameras 101 are wired into the central controller 403 through the vehicle. In another embodiment the cameras 101 are wirelessly connected to the control unit 301. In this embodiment the camera 101 is coupled to a different power source 406. This will allow the camera 101 to be separable from the vehicle. In these embodiments the control unit 301 further has a wireless transceiver. The wireless transceiver can be configured to transmit and receive in various different forms.

Figure 5:
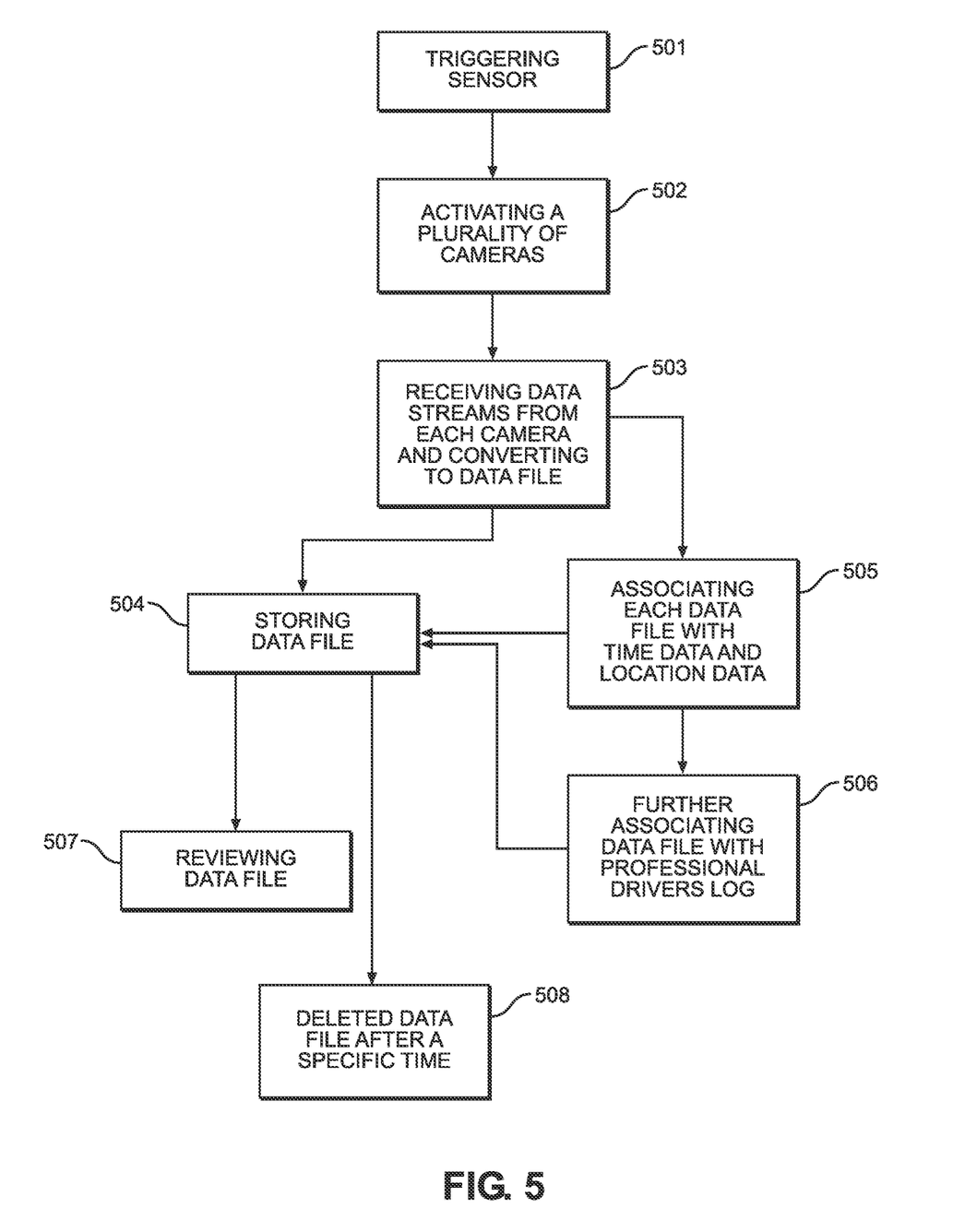
FIG. 5 shows a flow chart of an embodiment of a method for operating the vehicle camera and control system.

Referring now to FIG. 5, there is shown a flow chart of an embodiment of a method for operating the vehicle camera and control system. In one embodiment the method starts when a sensor is triggered 501. The sensor will signal to the control unit to activate the plurality of cameras 502. The controller will then receive streams from each of the plurality of cameras 503. Next the controller will direct the data streams to be saved as data files. In another embodiment, the control unit will associate the data files with further data 505. In one embodiment the further data comprises a date, a time, and a location stamp. From this stage, the data files can then be stored 504. In another embodiment, the data files will further be associated with a professional driver log 506. After the data is properly associated the data is then stored 504. After the data is stored the data can be reviewed 507 in one embodiment. In another embodiment the data can be automatically deleted if not used after a specified amount of time 508.

Figure 6:
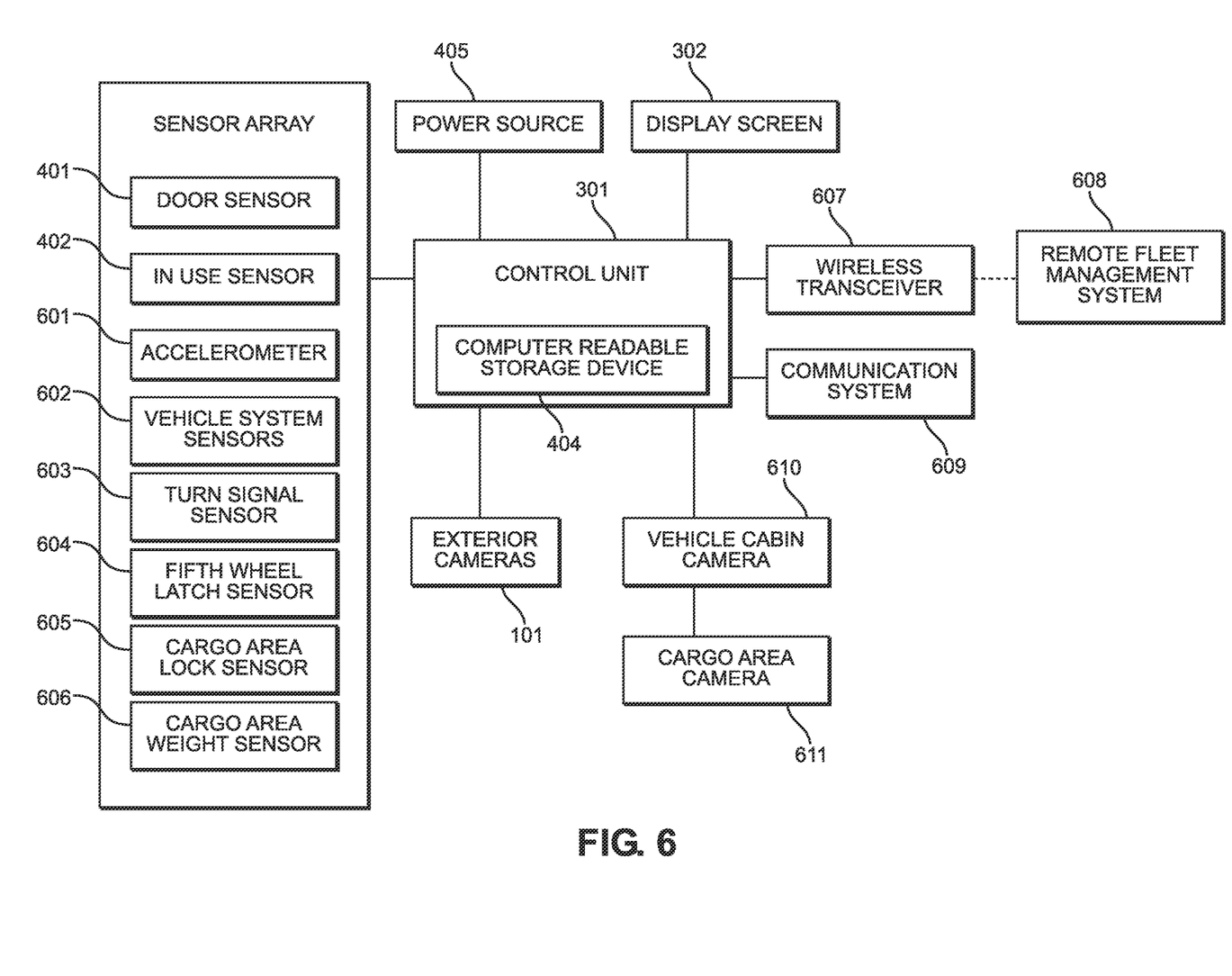
FIG. 6 shows a schematic view of an alternate embodiment of the vehicle camera and record system.

Referring now to FIG. 6, there is shown a schematic view of an alternate embodiment of the vehicle camera and record system. In the illustrated embodiment, the vehicle camera and record system is in wireless communication with a remote fleet management system 608 via a wireless transceiver 607 operably connected to the control unit 301. The remote fleet management system 608 is configured to monitor and store data related to a driver profile associated with the control unit 301. All data stored onto the local computer readable storage device 404 is further contemplated to be transmitted for remote storage and monitoring by the remote fleet management system 608. In this manner, multiple different vehicles and driver profiles can be simultaneously monitored and overseen. In some embodiments, the particular driver of the vehicle having the control unit 301 thereon inputs login credentials into the control unit 301 via an input system, such as a physical keyboard or a touch-sensitive keyboard displayed on the display screen 302. In this manner, the data recorded by the control unit 301 onto the computer readable storage device 404 is associated with a particular driver rather than an individual vehicle. In such embodiments, the control unit 301 is configured to record the time of any driver login, log off, or any other listed change in duty status by the driver. For example, should the driver log into a particular driver profile, the control unit 301 records the time and date of that action, as well as when the driver designates that the driver is going off-duty, meaning that further driving with the vehicle is designated as personal use. The control unit 301 is further configured to log a location at which such changes are recorded, such that a graph or map can be generated displaying change in duty status timings associated with the particular location at which the change in duty status was logged. In this manner, the remote fleet management system 608 can catalogue and analyze driver performance based on duty status and location. Upon driver log in, the display screen 302 is configured to display unassigned driving time and miles driven to alert the driver to unapproved or personal vehicle use between user log ins. A communication system 609 is operably connected to the control unit 301, wherein the communication system 609 is configured to allow a driver to directly communicate with a dispatcher or fleet management supervisor. The communication system 609 is contemplated to comprise a text messaging system displayed on the display screen 302, or alternatively a speaker and microphone installed in the vehicle cabin, allowing the driver to speak directly with the dispatcher. Furthermore, in some embodiments, a vehicle cabin camera 610 is operably connected to the control unit 301, wherein the vehicle cabin camera 610 is further configured to record an image or video of the vehicle cabin interior upon being activated by one or more conditions as further explained elsewhere herein. In such embodiments, the driver can be recorded to determine whether the current driver matches the currently logged in driver profile, or to otherwise allow a remote dispatcher to observe the driver of the vehicle.

A plurality of sensors are distributed throughout the vehicle and are operably connected to the control unit 301, such that the control unit 301 is configured to record data upon one of the plurality of sensors detecting a triggering circumstance. In one embodiment, vehicle system sensors 602, including, but not limited to, odometer, speedometer, fuel gauge, oil gauge, engine temperature gauge, and air pressure gauge are configured to monitor the status of the associated vehicle system to record, store, and report the status of each vehicle system in real time to each of the computer readable storage device 404 and the remote fleet management system 608. In this manner, the user can be readily alerted of dangerous vehicle system statuses, as well as informing the remote fleet management system 608 of potentially poor maintenance of the associated vehicle. Furthermore, an accelerometer 601 is configured to detect vehicle motion, such that the control unit 301 can determine when the vehicle is being driven, rather than idling via the in-use sensor 402 which detects engine activity generally. Additionally, the accelerometer 601 is configured to detect sudden changes in vehicle motion, such that the control unit 301 can record footage from the exterior cameras 101, and any additional camera and sensor data, to determine whether the vehicle was in an accident, roughly or excessively braked, or other causes of sudden deceleration. Particularly, the control unit 301 is configured to record at a regular interval, such as every 60 seconds, while the vehicle is in motion as determined by the accelerometer 601, as well as at every change of engine status detected by the in-use sensor 402.

The system is further contemplated to monitor the surroundings of the vehicle at all times via at least the exterior cameras 101, whereupon detecting a vehicle approaching at an acceleration above a set threshold indicating a potential collision, or alternatively, upon detection of a vehicle within a predefined proximity threshold, the control unit 301 is configured to alert the driver via audible, visual, or other alert message, and further record and transmit the camera footage to the computer readable storage device 404 and the remote fleet management system 608, respectively. The exterior cameras 101 are contemplated to each be a 360-degree camera to provide a full view of the vehicle surroundings and minimize blind spots. For example, the control unit 301 is configured to calculate the speed of approaching vehicles relative to the speed of the vehicle, wherein the speeds of the approaching vehicles are further recorded and transmitted as previously described. A rear-facing camera of the exterior cameras 101 is further configured to transmit a live feed to the display screen 302 upon the vehicle being placed in reverse to provide a visual area of the rear of the vehicle for docking a semi-trailer. Particularly, the communications system 609 may issue an audible alert to inform the driver of an approaching vehicle from a designated area. Additionally, the exterior cameras 101 are configured to monitor the areas surrounding the vehicle, such that upon a turn signal sensor 603 detecting an activation of the vehicle turn signal, the control unit 301 will interpret the camera footage and announce any detected obstacles in the path of a potential vehicle lane change via the communication system 609, the display screen 302, or a combination thereof. Similarly, the control unit 301 will record and transmit any footage indicating detected obstacles to the computer readable memory device 404 and the remote fleet management system 608. In this manner, the dispatcher or fleet management can determine whether the driver of the vehicle changed lanes inappropriately upon notification of the detected obstacles.

Furthermore, in the shown embodiment, a cargo area camera 611 is disposed within the cargo area of the vehicle, such as a trailer interior, trunk, or other storage space, to record the appearance of the cargo area throughout the trip. The footage from the cargo area camera 611 is stored and transmitted as previously described by the control unit 301, such that a continuous 360-degree view of the cargo area is maintained between cargo pickup and cargo drop off. The cargo area camera 611 may further comprise a heat sensor or motion sensor, whereupon actuation of either or both sensors, the control unit 301 activates the cargo area camera 611 to record the interior of the cargo area to the computer readable memory device 404 and transmit the recording to the remote fleet management system 609. A cargo area lock sensor 605 is operably connected to a cargo area lock to detect when the cargo area is unlocked and opened. Upon detection of the cargo area being unlocked, the cargo area camera 611 is configured to record and transmit the footage as previously described, and an alert is noted and sent to the communication system 609, display screen 302, and the remote fleet management system 609. In this manner, whenever an individual enters or interacts with the cargo, the activity is logged and recorded to ensure proper management of the cargo. In some embodiments, at least one cargo area weight sensor 606 is operably connected to each tandem axle of the cargo area, such as a trailer, such that the weight of the trailer is constantly monitored, recorded, and transmitted to the remote fleet management system 609. In this manner, changes in weight are noted and logged to the driver's profile and transmitted to the remote fleet management system 609 to record when deliveries are completed. Alternatively, theft or other improper activities are similarly recorded. In the shown embodiment, a fifth wheel latch sensor 604 is operably connected to the fifth wheel latch of the trailer system, such that the fifth wheel latch sensor 604 is configured to detect when the trailer is connected to or disconnected from the fifth wheel latch system. Upon detection of the fifth wheel latch being actuated in either manner, the control unit 301 is configured to log and record the incident in the computer readable storage device 404 and transmit the data to the remote fleet management system 609. In this manner, the dispatcher and fleet management can determine when trailers have been picked up or dropped off and compare the recorded data with expected delivery timetables.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A vehicle camera and record system, consisting of:
   a plurality of cameras positioned around a vehicle, including:
      a hood camera affixed to a hood of the vehicle;
      a pair of wheel cameras each affixed above a wheel of the vehicle;
      an underbody camera affixed to an underbody of the vehicle;
      at least one roof camera affixed to a roof of the vehicle;
      at least one side camera affixed to a side of the vehicle;
      at least one camera affixed to a trunk of the vehicle;
      a vehicle cabin camera affixed within a cabin of the vehicle;
      a cargo camera affixed within a cargo area of the vehicle;
      a cargo area camera including a heat sensor, whereupon actuation of the heat sensor, a control unit activates the cargo area camera to record an interior of the cargo area to a computer readable memory device and transmit a first recording to a remote fleet management system;
   wherein the cargo area camera includes a motion sensor, whereupon actuation of the motion sensor, the control unit activates the cargo area camera to record the interior of the cargo area to the computer readable memory device and transmit a second recording to the remote fleet management system;
   wherein the plurality of cameras are operably coupled to the control unit;
   wherein the plurality of cameras are removably attached to the vehicle;
   wherein the plurality of cameras are wirelessly coupled to the control unit;
   wherein the plurality of cameras have a slightly overlapping field of view;
   wherein the plurality of cameras are wired to the control unit;
   wherein the plurality of cameras are placed around a semi-truck and trailer;
   further comprising a power source located in each camera of the plurality of cameras;
   wherein the power source is a vehicle battery;
   wherein the control unit turns the plurality of cameras on and off and directs storage of a plurality of video footage captured by the plurality of cameras;
   wherein the control unit includes a first port configured to accept SD cards for additional storage and a second port that includes a USB port for attaching an external device to the control unit;
   wherein the control unit is located within a dashboard of the vehicle;
   further comprising a display screen operably coupled to the control unit;
   wherein the control unit is configured to calculate a relative speed between the vehicle and an alternate vehicle in the surrounding area via the plurality of cameras, such that upon detection of an object exceeding a threshold relative speed, an alert is sent via a communication system disposed within the control unit;
   wherein the second port accepts a USB connector;
   wherein the USB connector is a micro USB connector;
   wherein the display screen folds down and slides within a housing of the control unit through a slot disposed on the housing;
   wherein the display screen includes a picture in picture feature to allow a person to view the video and do another task at the same time;
   wherein the plurality of video footage storage includes a plurality of data files each with at least a time, a date, and a plurality of location data is attached to the data file;

a first sensor having a door sensor located within a door handle of the vehicle;
wherein the door sensor is operably coupled to the control unit;
a second sensor operably coupled to the control unit that includes an in-use sensor configured to detect when the vehicle is in use;
a computer readable storage device operably coupled to the control unit to store the video footage;
further comprising a plurality of vehicle sensors configured to record and store a plurality of recorded data within the data file;
wherein the plurality of vehicle sensors are selected from the group consisting of a fuel level sensor, an oil pressure sensor, an engine temperature sensor, and a tire air pressure sensor;
further comprising a wireless transceiver in wireless communication with the remote fleet management system, wherein the control unit is configured to transmit the data file to the remote fleet management system for storage and monitoring;
wherein the control unit is configured to activate at least one camera of the plurality of cameras and store video footage if either the first sensor detects an individual attempting to enter the vehicle or the second sensor detects the vehicle is in use;
further comprising a cargo area weight sensor operably connected to at least each tandem axle of the vehicle, wherein a weight detected by the cargo area weight sensor is recorded in the data file;
further comprising a cargo area lock sensor, whereupon the cargo area camera is activated upon detection of a cargo area lock that transitions from a locked state to an unlocked state.

* * * * *